United States Patent
Olds et al.

(10) Patent No.: US 6,625,129 B1
(45) Date of Patent: Sep. 23, 2003

(54) DEMAND ASSIGNED SPATIAL MULTIPLEXING IN SATELLITE COMMUNICATION SYSTEMS

(75) Inventors: Keith A. Olds, Mesa, AZ (US); Carl Myron Wagner, Higley, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/410,449

(22) Filed: Oct. 1, 1999

(51) Int. Cl.[7] ........................ H04B 7/185; H04B 7/204; H04B 7/216; H04B 7/212; H04Q 7/20
(52) U.S. Cl. .................. 370/316; 370/319; 370/320; 370/321; 370/323; 455/431; 455/427; 455/430; 455/12.1
(58) Field of Search ................ 455/11.1, 12.1, 455/13.2, 427, 429, 430, 512, 517, 431; 370/316, 319, 320, 321, 323

(56) References Cited

U.S. PATENT DOCUMENTS

| | | | |
|---|---|---|---|
| 4,901,307 A | * 2/1990 | Gilhousen et al. | 370/18 |
| 5,268,694 A | 12/1993 | Jan et al. | 342/354 |
| 5,367,304 A | 11/1994 | Jan et al. | 342/352 |
| 5,519,404 A | 5/1996 | Cances et al. | |
| 5,612,701 A | 3/1997 | Diekelman | 342/354 |
| 5,638,399 A | * 6/1997 | Schuchman et al. | 375/202 |
| 5,737,684 A | * 4/1998 | Goto | 455/12.1 |
| 5,739,784 A | 4/1998 | Jan et al. | 342/354 |
| 5,749,044 A | 5/1998 | Natarajan et al. | 455/13.1 |
| 5,826,189 A | 10/1998 | Thapa et al. | 455/428 |
| 6,032,041 A | * 2/2000 | Wainfan et al. | 455/427 |
| 6,101,385 A | * 8/2000 | Monte et al. | 455/427 |
| 6,381,228 B1 | * 4/2002 | Prieto, Jr. et al. | 370/323 |

FOREIGN PATENT DOCUMENTS

| | | |
|---|---|---|
| EP | 0837567 A2 | 4/1998 |
| WO | WO97/20362 | 6/1997 |

OTHER PUBLICATIONS

"Demand Assignment in the ACTS LBR System", by Palmer, IEEE Transaction on Communications, 38(1990)May, No. 5, New York, pp. 684–692.

* cited by examiner

*Primary Examiner*—William Trost
*Assistant Examiner*—Meless Zewdu
(74) *Attorney, Agent, or Firm*—Jennifer B. Wuamett; Frank J. Bogacz

(57) ABSTRACT

The methods (300, 900, and 1200), and apparatus (140 and 800) of the present invention employ demand assigned spatial multiplexing in a satellite communication system (100) to efficiently accommodate varying demand for high data rate service while minimizing satellite antenna and radio system complexity in a ubiquitous coverage satellite system optimized for transporting packet data. In a preferred embodiment, the methods (300, 900, 1000 and 1200) and apparatus (140 and 800) of the present invention use a first set of signaling beams (210) to establish signaling uplinks and then direct traffic spot beams (220) at particular UE devices to support traffic uplinks in accordance with demand assigned multiple access (DAMA) parameters when and only when the UE devices have traffic data to transmit to a satellite. In a preferred embodiment, UE device (140) also executes a method (1200) that includes steps for determining appropriate steering angles for a servicing satellite (110) to use to direct a traffic spot beam (220) to the UE device's location when the UE has traffic data to transmit.

27 Claims, 10 Drawing Sheets

DEMAND ASSIGNED SPATIAL MULTIPLEXING IN SATELLITE COMMUNICATION SYSTEMS

FIELD OF THE INVENTION

This invention relates generally to the field of satellite communication systems and, more particularly, to satellite-based RF communications.

BACKGROUND OF THE INVENTION

An important issue in satellite communications systems is that of achieving a balance between desired satellite coverage requirements and the need for high gain beams to enable the system to achieve high data rates and high quality link performance with relatively small, low power, low cost user equipment (UE). The give and take needed to achieve a desirable balance between these system parameters is especially difficult in satellite systems intended to provide ubiquitous coverage and service, where the need to provide service throughout the entire satellite field of view (FOV) mitigates against the use of high gain beams each of which only covers a small area.

Consider the following example for illustrative purposes. A low earth orbit (LEO) satellite operating at an altitude of 780 kilometers (km) altitude with a 10 degree minimum service elevation angle has a FOV covering about 13.6 million square km. An antenna with 30 decibels of gain relative to isotropic radiation (dBi) typically has a half power beam width of 5.5 degrees, which covers approximately 4769 square km. Therefore, 2843 beams would be needed to cover the entire FOV with no overlap. Since, as a practical matter some overlap is necessary, the actual number of beams would approach 3000. If the antenna gain increases, for example to compensate for a higher altitude, the number of beams also increases. Thus, the use of high gain beams in a system with continuous ubiquitous coverage requires a complex satellite antenna system and a correspondingly complex radio subsystem to make use of all of the beams.

Most prior art systems have addressed the problem of high gain beam coverage in one of the following ways. Systems designed to provide ubiquitous coverage generally surrender high gain antenna beams and the corresponding advantages thereof. This allows the satellite to cover the FOV with a reasonable number of low gain beams, but places a severe burden on the UE to achieve the desired link performance. For example, if the 13.6 million square km FOV above is covered by 48 beams rather than thousands, the antenna gain drops to about 12 dBi resulting in an 18 dB deficit. This deficit is typically compensated for through increases in UE transmitter power and/or UE antenna size on the uplink and with UE antenna size and/or satellite transmitter power on the downlink. This solution is not attractive for systems that require small low cost UE.

An alternate prior art approach to avoiding the need for several thousand high gain beams is to relinquish simultaneous ubiquitous coverage. Referring back to the above example, if a satellite projects a 48 antenna beams with 30 dBi antenna gain in a 13.6 million square km FOV, less than 2% of the FOV is covered by the beams at any time. Generally prior art systems of this kind have simply not provided ubiquitous service. In these systems the locations where service will be provided is predetermined either permanently or for some period of time, and other areas are simply not served.

Other prior art systems using high gain beams have attempted to retain ubiquitous service by scanning or hopping the available beams over the FOV in a predetermined manner. This allows all desired locations to be served, but introduces serious capacity and delay limits that systems with continuous ubiquitous coverage do not have. Nevertheless, many prior art satellite systems, primarily those that operate in geostationary orbit (GSO) have accepted the limits of small predetermined spot beam coverage in order to avoid the satellite and UE complexities and costs associated with true ubiquitous coverage.

One way to use high gain spot beams in a satellite system and still provide ubiquitous service is to direct a spot beam at a location only when that location has traffic. This approach has been applied for the satellite to UE downlink in prior art systems. In these systems, the traffic includes the address of a destination UE that is associated by the satellite with the UE location. Thus, when and only when the satellite receives traffic destined for a particular location does the satellite direct a beam to that location. Once the traffic has been sent to the destination location, the directed beam is then available to direct traffic to different locations. Since data traffic for a particular user in packet switched networks generally comprises bursts of traffic interspersed with periods of idle time, this data directed beam steering approach avoids wasting precious satellite beam and radio resources in areas where there is no traffic to send.

In a prior art system described in U.S. Pat. No. 5,612,701 to Diekelman, a broad access beam is used to allow communication units to request assignment to a narrow spot beam. In that system, communication units are assigned both an uplink and a downlink spot beam for the duration of their connection to the satellite network. Diekelman teaches a method of steering a narrow spot beam to allow it to be simultaneously shared between a group of users located in close proximity of each other. This is an effective approach to resolving the trade between ubiquitous coverage and high gain beams for a voice telephony or other circuit switched network, but it would result in inefficient use of limited radio resources in a packet-switched data network.

The data directed beam steering approach used in some prior art systems for satellite downlinks enables a satellite to receive data from the network in a packet that contains the destination location. Since the satellite may read this destination information, it may determine where a downlink beam needs to be pointed in order to send traffic to the appropriate UE. However, this technique is not optimal for transmission over the UE to satellite uplinks, because the satellite does not known which UE desires to send traffic to the satellite at any particular time. Thus, the uplinks of prior art satellite systems have been limited to one of the less efficient methods of achieving ubiquitous service described above.

What is needed is a method and apparatus for efficiently accommodating varying demand for high gain beams on the UE to satellite uplink while minimizing satellite antenna and radio system complexity and power consumption in a ubiquitous coverage satellite system.

BRIEF DESCRIPTION OF THE DRAWINGS

The invention is described below with particularity in the appended claims. However, other features of the invention will become more apparent and the invention will be best understood by referring to the following detailed description in conjunction with the accompanying drawings, in which like reference designators are used to designate like elements, and in which:

DETAILED DESCRIPTION OF THE DRAWINGS

The methods and apparatus of the present invention efficiently accommodate varying demand for high gain uplink beams while minimizing satellite antenna and radio system complexity in a ubiquitous coverage satellite system optimized for transporting packet data. Furthermore, the methods and apparatus of the present invention better service geographically and temporally varying subscriber demands while minimizing power consumption. In a preferred embodiment, the methods and apparatus of the present invention directs high gain uplink spot beams at particular UE devices in accordance with demand assigned multiple access (DAMA) parameters when and only when the UE devices have traffic to transmit to a satellite.

Advantages of the methods and apparatus of the present invention include, but are not limited to the following. First, the methods and apparatus of the present invention allows for more efficient use of satellite resources and enables satellites of ubiquitous coverage satellite systems to be relatively low mass and have lower power consumption than prior art satellites. Additionally the methods and apparatus of the present invention allow for UE to be used in such satellite communication systems to be more cost effective and also to have lower power requirements than prior art UE. Furthermore, the methods and apparatus of the present invention enable satellite communication system operators to achieve shorter network delays for transmissions by avoiding the delays associated with scanning over the FOV. Additional advantages and features of the invention will become apparent from the description that follows and may be realized by means of the instrumentalities and combinations particularly pointed out in the appended claims.

Figure 1:
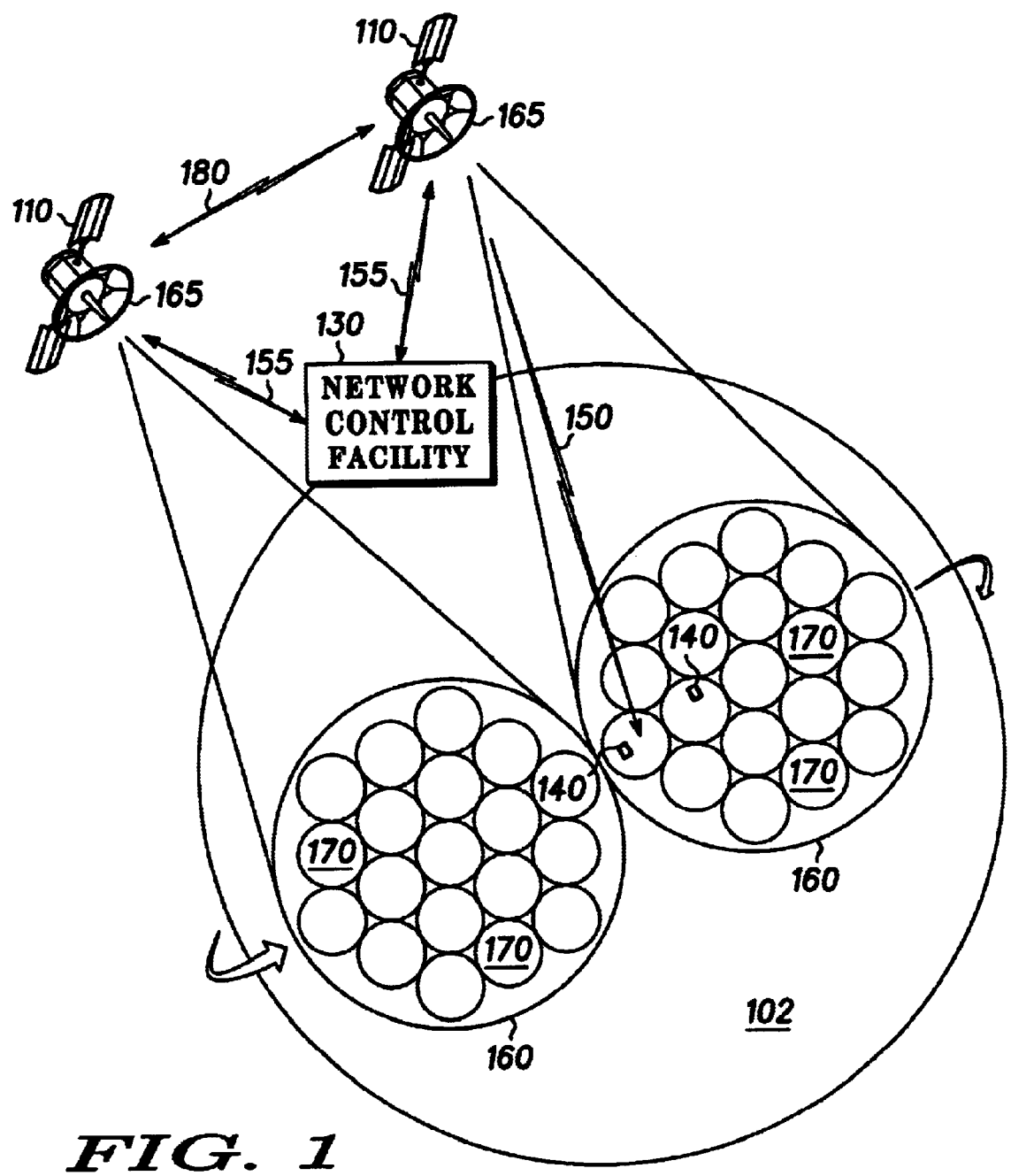
FIG. 1 illustrates a highly simplified diagram of a portion of a satellite communication system in which the present invention may be practiced.

FIG. 1 illustrates a highly simplified diagram of a portion of a satellite communication system 100 in which the present invention may be practiced. System 100 includes at least one satellite 110. While the present invention is advantageously employed when a large number of satellites are being used in a constellation, it is also applicable with as few as a single satellite. For ease of illustration, FIG. 1 illustrates only two satellites 110.

A "satellite" is defined herein to mean a man-made object or vehicle intended to orbit a celestial body, such as earth 102, and includes both geostationary orbit (GSO) and orbiting satellites and/or combinations thereof, including for example, low earth orbiting (LEO) satellites, medium earth orbit (MEO) satellites, high earth orbit (HEO) and other nongeostationary earth orbit (NGSO) satellites. A "constellation" is defined herein to mean an ensemble of satellites arranged in orbits for providing specified coverage (e.g., radio communication, photogrammetry, etc.) of portion(s) or all of earth 102. Satellite orbits may comprise any configuration, including for example, circular or elliptical, and may be polar or inclined. System 100 also desirably includes a Network Control Facility (NCF) 130 and at least one UE device 140. In general, satellites 110, UE 140, and NCF 130 of communication system 100 may be viewed as a network of nodes. Each node of communication system 100 is or may be in data communication with other nodes through communication links. Additionally, all nodes of communication system 100 are, or may be, in data communication with other communication devices dispersed throughout the world through public switched telephone networks (PSTNs) and/or conventional terrestrial communication devices coupled to a PSTN through conventional terrestrial facilities.

UE devices 140 may be located anywhere on or below the surface of the earth or in the atmosphere above the earth's surface. Each UE device 140 is preferably a communication device capable of transmitting data and receiving data from, satellites, such as satellites 110. By way of example, UE 140 may be a computer or other devices capable of sending and receiving data, e-mail messages, video signals or facsimile signals to name a few. In a preferred embodiment of the present invention, UE 140 moves at negligible speeds in comparison to satellites 110.

In a preferred embodiment, satellites 110 may communicate with each other and/or with other nearby satellites (not shown) through inter-satellite links 180. Thus, a communication from a UE 140 located at any point on or near the surface of the earth may be routed through a constellation of satellites, including satellites 110, to within range of substantially any other point on the surface of the earth. In alternate embodiments, communications are routed down to a UE 140 on or near the surface of the earth from satellite 110 using a communication link 150 or are routed down to or up from any one of many earth terminals (not shown).

Antenna subsystem 165 of satellite 110 projects a first set of antenna beams or cells 170 within FOV 160. Cells 170 are illustrated for convenience in FIG. 1 as being discrete, generally circular shapes without overlapping regions. However, one skilled in the art will understand that in actual practice, cells projected from satellite 110 may take on other shapes and may, for example, be elliptic, hexagonal, rectangular or square. Additionally, antenna subsystem 165 may provide cells that have significant overlapping regions, as shown and described later with reference to FIG. 2.

Figure 2:
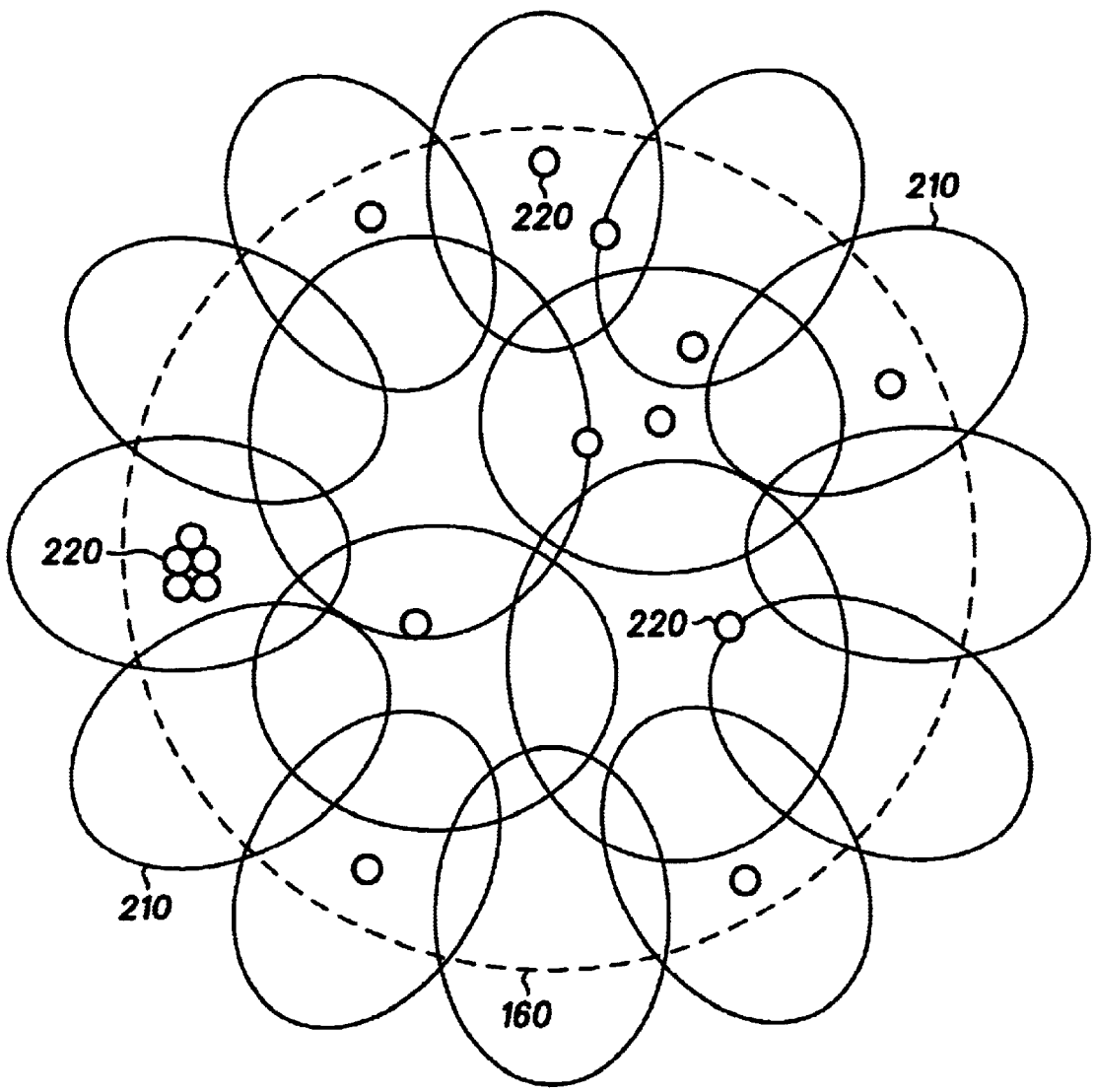
FIG. 2 illustrates an example of a satellite field of view (FOV) reflecting relative coverage of signaling uplink beams and traffic uplink spot beams in accordance with a preferred embodiment of the present invention.

FIG. 2 illustrates in an example of a satellite FOV reflecting relative coverage of signaling beams 210 and traffic uplink spot beams 220 in accordance with a preferred embodiment of the present invention. In a preferred embodiment of the present invention, antenna subsystem 165 of satellite 110 includes antenna uplink subsystem (800, FIG. 8) comprising both a signaling uplink subsystem and a traffic uplink subsystem, as described in further detail with reference to FIG. 8. Thus, within FOV 180, antenna subsystem 165 (FIG. 1) projects two sets of beams, (i) relatively large, relatively low gain signaling beams 210 for establishing a UE to satellite radio uplink with and transmitting signaling data to the UE and (ii) one or more relatively high gain traffic spot beams 220, for establishing a traffic uplink between UE 140 and satellite 110. In a preferred embodiment, signaling beams 210 cover substantially all of the satellite FOV substantially simultaneously while traffic spot beams 220 cover a fraction of the satellite's FOV 160. Signaling beams 210 each are connected to a low data rate random access channel.

In a preferred embodiment, spot beams 220 may be directed to any point in the satellite FOV 160. In an alternate embodiment spot beams 220 may be steered to any point in a portion or subregion (not shown) of the satellite FOV. In this alternate embodiment, the beams and their subregions are arranged so that at least one spot beam 220 may be steered to cover any point in the FOV. In yet another alternate embodiment, satellites 110 have a large number of traffic spot beams 220 that cover the entire FOV 180. In this alternate embodiment, however, only a small number of spot beams 220 are available to carry uplink traffic at any time, and satellite antenna subsystem 165 does not steer spot beams 220, but rather designates certain spot beams 220 to carry traffic at a particular time based on demand. Thus, in any of the aforementioned embodiments, antenna subsystem 165 directs traffic spot beams 220 to receive data from UE 140 (FIG. 1) at a particular time in response to a request for service by UE 140.

Additionally, in a preferred embodiment of the present invention, signaling beams 210 support links operating on low frequencies and at low data rates while traffic spot beams 220 operate at high frequencies with high data rates. The combination of low frequency and low data rate in traffic spot beams 220 allow the uplink between the UE and satellite to be established and operated with a low bit error rate, in spite of the low gain of the signaling antennas of antenna subsystem 165. In a preferred embodiment, the radio carrier frequencies used for the uplink signaling channels associated with signaling beams 210 are in a significantly lower radio frequency band than the carrier frequencies used in the traffic spot beams 220. For example, in a preferred embodiment, the data rate used for the signaling uplink channels of low gain beams 110 is at least one thousand times lower than the data rate for the traffic channels of high gain beams 220. Additionally, in a preferred embodiment, the signaling uplink channels operate in a frequency band at least ten times lower than a frequency band of at which the uplink traffic channels associated with the high gain beams operate. In an alternate embodiment, the signaling frequency channels are located in the same radio frequency band as the traffic frequency channels.

In a preferred embodiment, UE 140 (FIG. 1) is capable of transmitting signals to and receiving signals from a satellite and knows the location and trajectory of the satellite or satellites that is serving its location at any given time. This information may be transmitted by the satellite to the UE, it may be independently determined by the UE, or some combination of both. For satellite systems where a UE device's location is simultaneously in the FOV of multiple satellites, the UE also is adapted to select a particular satellite with which to communicate, or it includes radio resources and one or both antenna(s) that allow it either to communicate with a particular satellite or to communicate with multiple satellites or both.

For a UE 140 (FIG. 1) to send data traffic to satellite 110, satellite 110 must direct a traffic spot beam 220 to the UE location. Furthermore UE 140 must be assigned appropriate radio resources before it may transmit data traffic to satellite 110. Appropriate radio resources may include frequency channels, time-slots or channel codes using techniques known to those familiar with the art. In a preferred embodiment, the system uses a combination of frequency channels and time-slots to create a hybrid high data rate frequency division multiple access/time division multiple access (FDMA/TDMA) communications architecture. However, other multiple access techniques, including for example, TDMA or CDMA, also are suitable for use in the methods and apparatus of the present invention.

Figure 3:
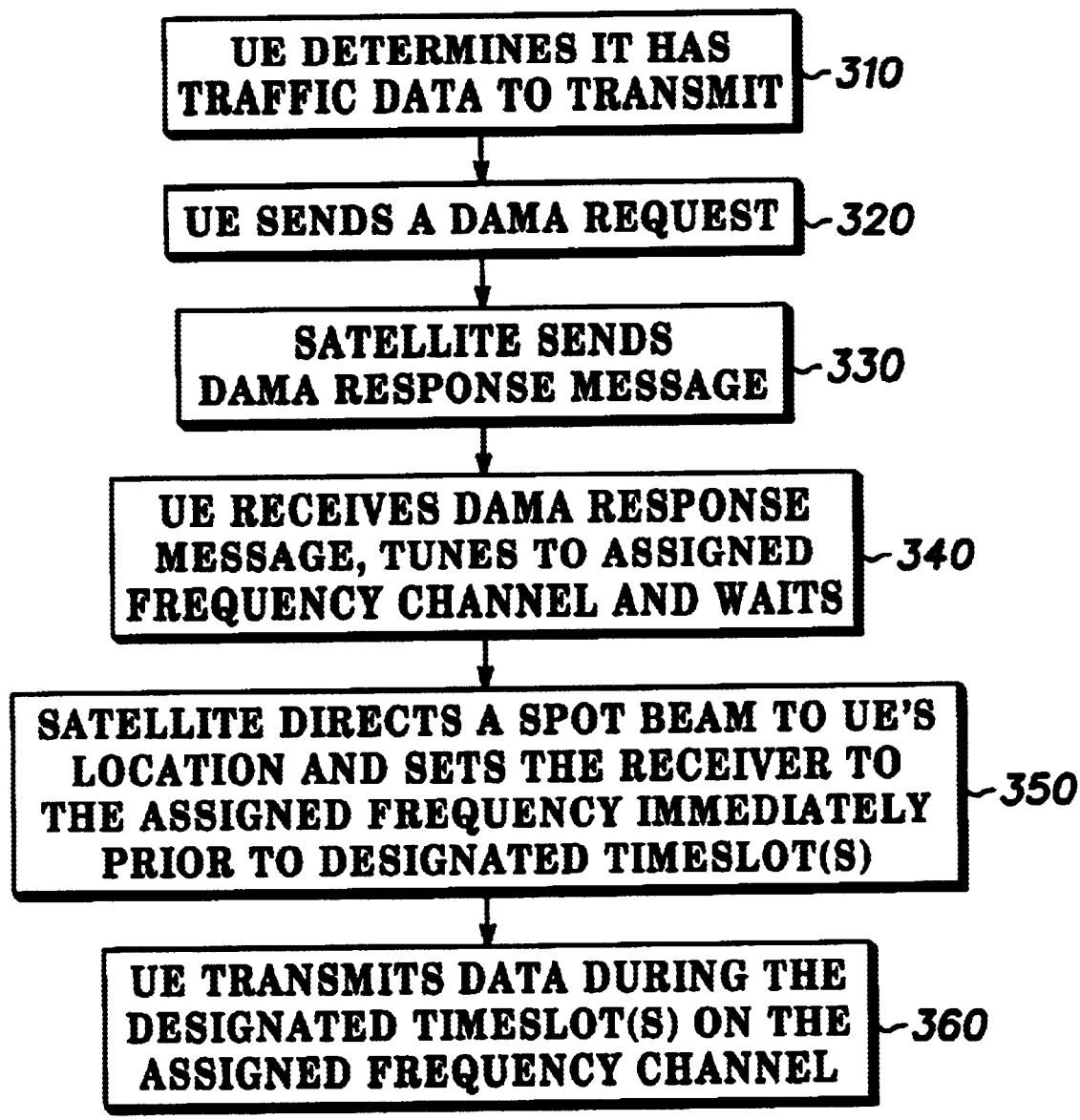
FIG. 3 illustrates a method for providing service to a requesting UE device in a satellite communication system in accordance with a preferred embodiment of the present invention.

FIG. 3 illustrates a method for providing service to a requesting UE device in a satellite communication in accordance with a preferred embodiment of the present invention. The operation of the uplink in the methods and apparatus of the present invention involves a new use of known demand assigned multiple access (DAMA) techniques. In this method, use of demand assignment is extended to include directing the pointing of the uplink spot beams.

Method 300 begins in step 310 when UE 140 (FIG. 1) determines that it has traffic data ready to be transmitted to a satellite. When UE 140 determines that it has one or more data packets awaiting transmission, in step 320 it sends a DAMA request to satellite 110 on an uplink signaling channel using a signaling beam 210 (FIG. 2), as further illustrated with respect to FIG. 4.

Figure 4:
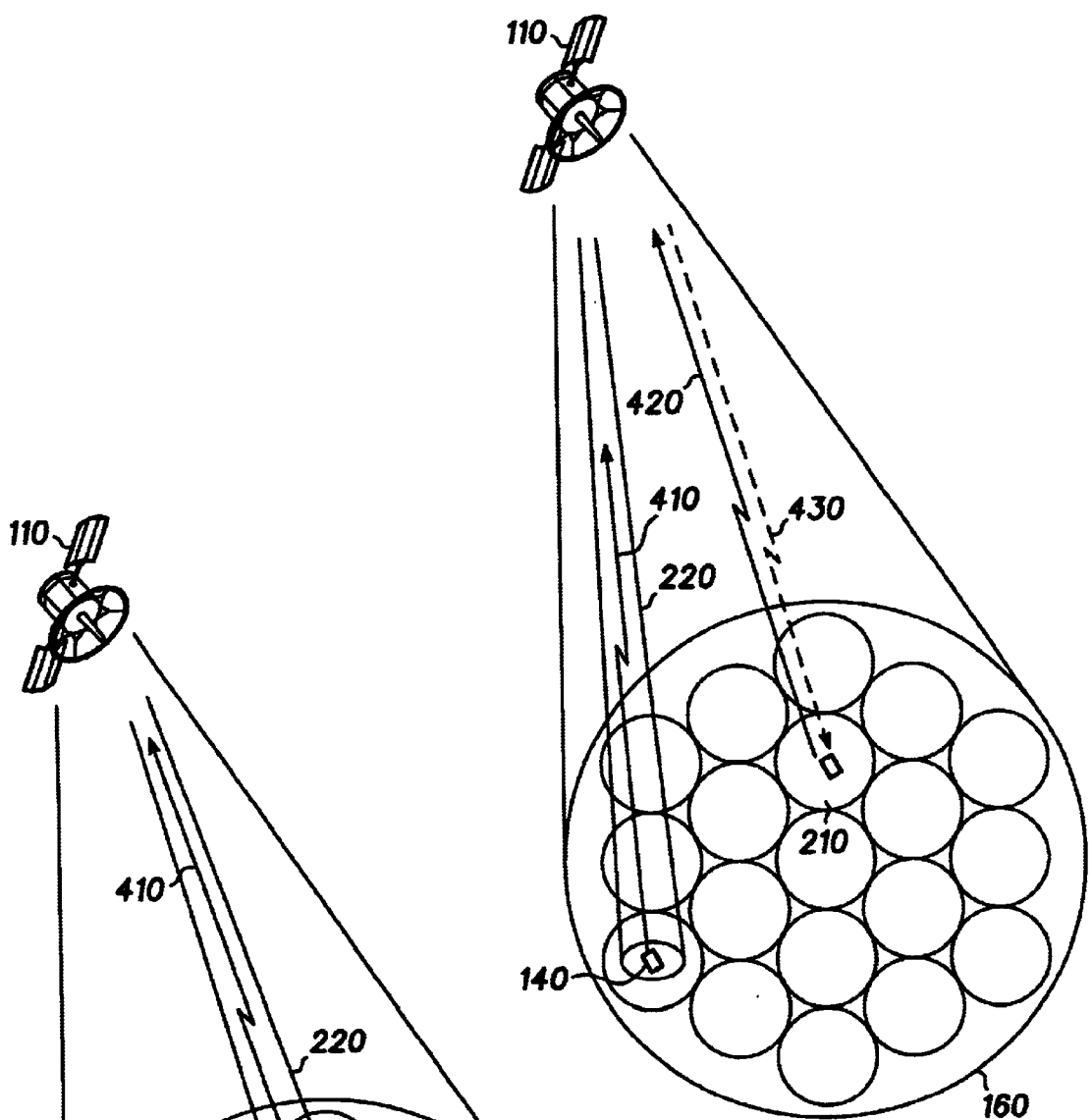
FIG. 4 illustrates establishment of a signaling uplink in accordance with a preferred embodiment of the present invention.

FIG. 4 illustrates establishment of a signaling uplink in accordance with a preferred embodiment of the present invention. As shown in FIG. 4, a first UE 140 is transmitting traffic data to satellite 110 using uplink 410 of traffic spot beam 220. In accordance with step 320 of method 300, FIG. 4 also illustrates second UE 142 sending a DAMA request over signaling uplink 420 of signaling beam 210. In a preferred embodiment, the uplink signaling channels for uplink 420 use a modified Slotted Aloha random access protocol (as discussed with reference to FIG. 12), although other media access protocols may also be used. In an alternate embodiment a scanning spot beam is used instead of the full FOV coverage beams to provide the signaling channel. In this embodiment, a poling or pre-assigned TDM media access protocol preferably is used.

As used herein, the term "DAMA request" means a request for service that includes at a minimum an identification of the amount of traffic channel data that needs to be sent and an identification of the UE location. In a preferred embodiment, the UE location is given in the DAMA request in terms of the satellite beam pointing angles which are calculated by the UE, as further described with reference to FIG. 12. This has the advantage of avoiding the need for the satellite to calculate the beam pointing angles based on a geographic UE location. Since the satellite handles voluminous DAMA requests in a short time, having the UE calculate and provide the pointing angles avoids the need for an additional major processing subsystem on the satellite.

Referring back to FIG. 3, when the satellite receives the DAMA request, it first determines when a beam will be available with adequate time-slots to receive the traffic data from the UE. It also selects a frequency channel for the UE that insures that the frequency arrangement of the frequency channels associated with traffic beams available in the assigned time-slots are such that there will not be interference between assigned traffic beams. The satellite then sends a DAMA response message to the UE in step 330. In a preferred embodiment, time-slot and frequency channel assignments for the UE are included in the DAMA response message. As shown in FIG.4, the DAMA response message is sent to UE 142 over link 430. In an alternate embodiment, however, the DAMA response message may be sent using a scanning spot beam (not shown).

In step 340 of method 300, the UE receives the DAMA response message from satellite 110, then adjusts its frequency to the assigned frequency included in the DAMA response message and waits for the assigned timeslot.

Figure 5:
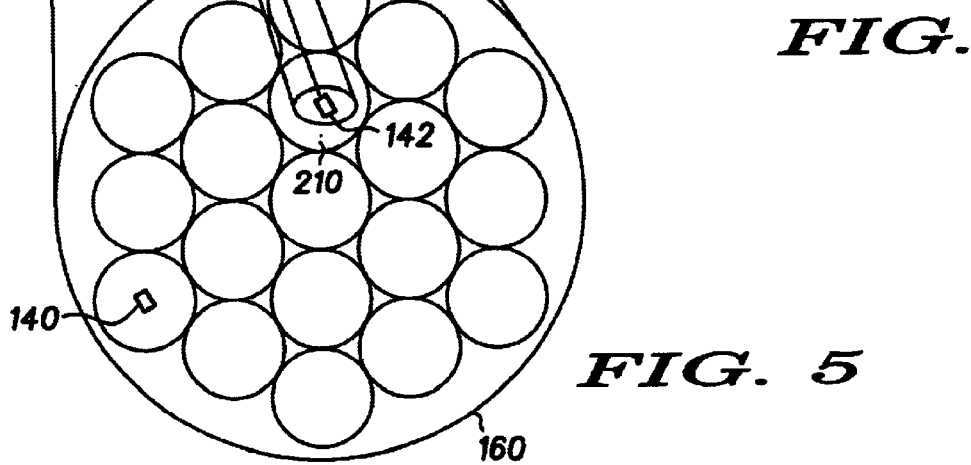
FIG. 5 illustrates establishment of a traffic uplink in accordance with a preferred embodiment of the present invention.

FIG. 5 illustrates establishment of a traffic uplink in accordance with a preferred embodiment of the present invention. In step 350 of method 300, immediately prior to the first assigned time-slot sent to the UE in the DAMA response message, satellite 110 directs a traffic spot beam 220 to UE 142 as shown in FIG. 5. Satellite 110 then adjusts the receiver tuner to receive on the assigned frequency, and UE to satellite uplink 410 is established. Referring back to FIG. 3, the UE 142 then transmits the data traffic to satellite 110 over link 410 so that it arrives at the satellite on the assigned frequency channel during the assigned time-slot or time-slots.

Figure 6:
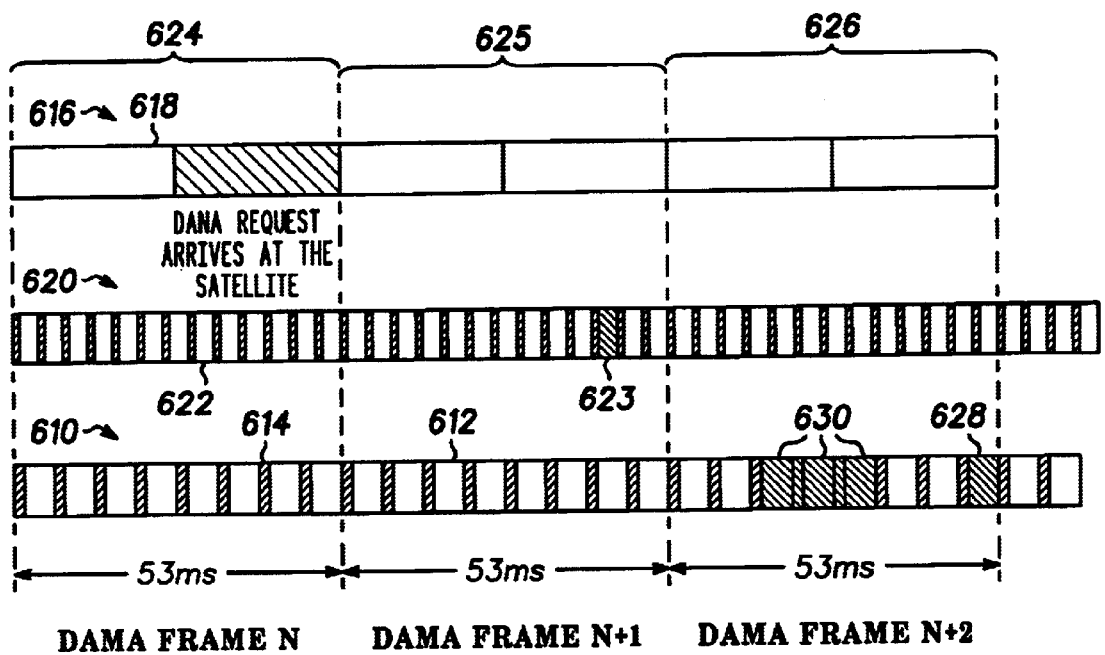
FIG. 6 illustrates an example of a timing diagram for a demand assigned multiple access (DAMA) transaction in accordance with a preferred embodiment of the present invention.

FIG. 6 illustrates an example of a timing diagram 600 for a DAMA transaction between a UE and a satellite in accordance with a preferred embodiment of the present invention. In timing diagram 600, satellite traffic uplink time format 610 is arranged in a series of traffic data time-slots 612 interspersed with beam-steering time-slots 614. The satellite signaling uplink time format 616 is also divided into time-slots 618 for the DAMA request signals. In a preferred embodiment, signaling time-slots 618 are fewer in number and longer in duration to allow operation at a lower data rate than uplink traffic time-slots 612. The data rate is reduced further in the signaling channels because the DAMA request message contains fewer bits than a traffic data packet. In a preferred embodiment, satellite to UE downlink 620 is similarly divided into time-slots 622. Downlink time-slots 622 are illustrated as being shorter than uplink traffic time-slots 612 because the downlink desirably uses a higher data rate than the uplink. However, the only downlink feature needed to support the uplink is the ability to send a DAMA response message to a particular UE in a timely manner (in accordance with step 330 of method 300 (FIG. 3)).

In a preferred embodiment of the present invention, the satellite communication system timing is divided into DAMA frames 624, 625, 626, each of which, in a preferred embodiment, have a duration of approximately 53 ms. Each DAMA frame 624, 625, 626, of timing diagram 600 includes a number of uplink signaling time-slots 618, uplink traffic time-slots 612 and downlink traffic time-slots 622. In a preferred embodiment, three DAMA frames 624, 625,626 are involved in a DAMA transaction. In preparing the DAMA response in accordance with step 330 of method 300, satellite 110 collects DAMA requests in first DAMA frame 624, processes and responds to the request with a DAMA response message 623 in a second DAMA frame 625, and assigns traffic slots (628 and/or 630) in a third DAMA frame 626.

Thus, referring back to FIG. 3, a UE device sends a DAMA request in step 620 that is received at the satellite in the shaded signaling time-slot in DAMA Frame N 624 (FIG. 6). The satellite compares this DAMA request to all other DAMA requests received in DAMA Frame N 624, and plans the timeslot, frequency channel and beam assignments for DAMA Frame N+2 626. This planning function is started as soon as the first DAMA request message is received in DAMA Frame N 624.

A single DAMA request message may request more than one time-slot. Thus, the DAMA response to the DAMA request may include several transmit time-slots and frequency channels in the same DAMA frame. If more than one time-slot is assigned, the multiple time-slots may be grouped together in time or they may be separated in time or some may be grouped and others separated as shown in FIG. 6 with respect to time-slot 628 and time-slot group 630. If several time-slots in a row are assigned to both a particular UE device and a particular spot beam, the spot beam remains directed to the UE device during those adjacent time-slots and is not redirected to a different UE between the time-slots. However, in a preferred embodiment, the satellite may use a different beam and a different frequency to establish the uplink in each time slot in the time slot group.

The traffic slot and frequency assignment process in the satellite considers a number of factors. In a preferred embodiment, the major factors are priority and interference. Additionally, in a preferred embodiment, the satellite system supports multiple service priorities, and the DAMA process assigns transmit opportunities to all UE devices that have requested the highest service priority before it assigns transmit opportunities to UE devices that have requested a lower service priority.

Figure 7:
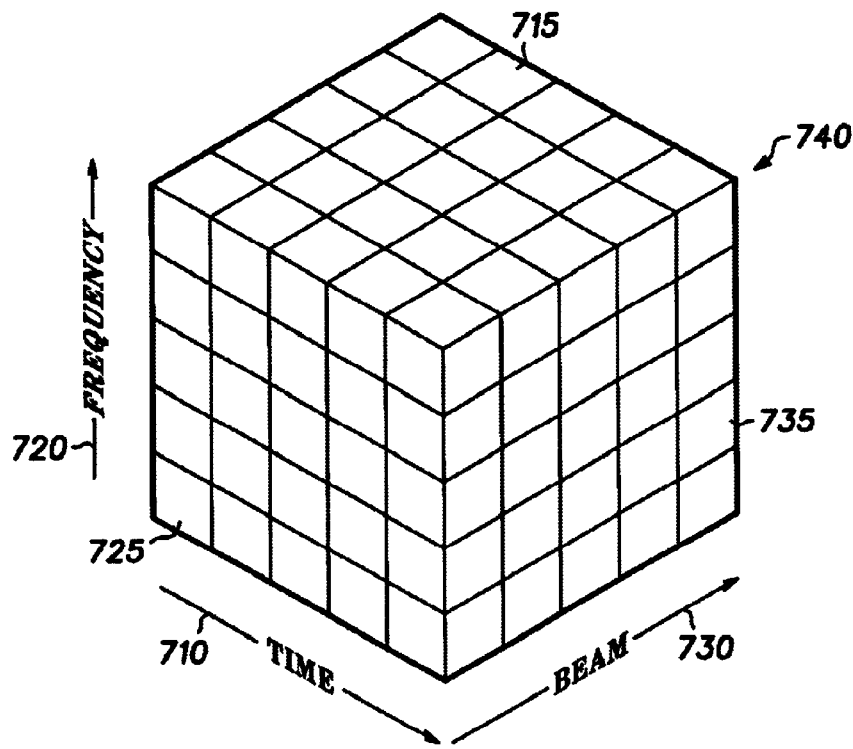
FIG. 7 illustrates a three dimensional optimization process for radio resource assignment in accordance with a preferred embodiment of the present invention.

FIG. 7 illustrates a three dimensional optimization process 700 for radio resource assignment in accordance with a preferred embodiment of the present invention. First dimension 710 represents time and is divided into increments 715 that represent the traffic time-slots 612 (FIG. 6). Second dimension 720 represents frequency and is divided into increments 725 that represent frequency channels. Third dimension 730 is divided into increments 735 that represent spot beams 220 (FIGS. 2, 4 and 5). Each small cube 740 in FIG. 7 represents a radio resource that may be assigned to a UE as a transmit opportunity 740.

In alternate embodiments, the optimization process 700 illustrated in FIG. 7 may be modified to further simplify the satellite or UE complexity and/or more closely optimize the resource allocation process in light of the overall system architecture and expected subscriber demands. In one alternate embodiment, a single frequency channel is used and the three dimensional process illustrated in FIG. 7 collapses to only two dimensions. In another embodiment, the system uses polarization reuse as well as frequency reuse. In this case the space becomes four dimensional with polarization as the fourth dimension. Another alternate embodiment uses CDMA codes as well as time and frequency to define the transmit opportunities. In this embodiment the CDMA codes define a dimension. Another alternate embodiment also uses CDMA but does not assign the codes on a demand basis. In this embodiment, the DAMA process only concerns itself with beam assignments.

The DAMA assignment process illustrated with respect to FIGS. 6 and 7 also operates to prevent UE transmissions from multiple UE devices from interfering with each other. This is accomplished, in a preferred embodiment, by ensuring that two or more UE devices do not use the same frequency channel during the same time-slot when their spot beams are located close together. In a preferred embodiment, the DAMA assignment process also considers possible interference into spot beam antenna sidelobes as well as into the spot beam itself. Because in a preferred embodiment there are more spot beams available than there are frequency channels, the DAMA assignment process assigns the same frequency channel in the same time-slot to UE devices that are separated far enough that their spot beams provide enough isolation to avoid interference.

Referring back to FIG. 6, once all of the assignments are made for DAMA Frame N+2 626, the DAMA assignment process causes the downlink 430 (FIG. 4) to transmit the DAMA assignments to the appropriate UE. This is accomplished in DAMA Frame N+1 625. In an alternate embodiment, the transmit assignments are transmitted as soon as they are made. This allows the satellite to send the assignments with less delay. In this alternate embodiment, assignments may be transmitted during the same DAMA frame in which the requests are received and some transmit opportunities may be assigned in the same or the following DAMA frame. This embodiment is preferred in systems where delay is the paramount consideration. It is not, however, preferred in a high quality, high capacity data network where service priorities are observed, and it is less efficient in the use of radio resources, since it does not allow global optimization of all of the transmit opportunities in a DAMA frame.

Figure 8:
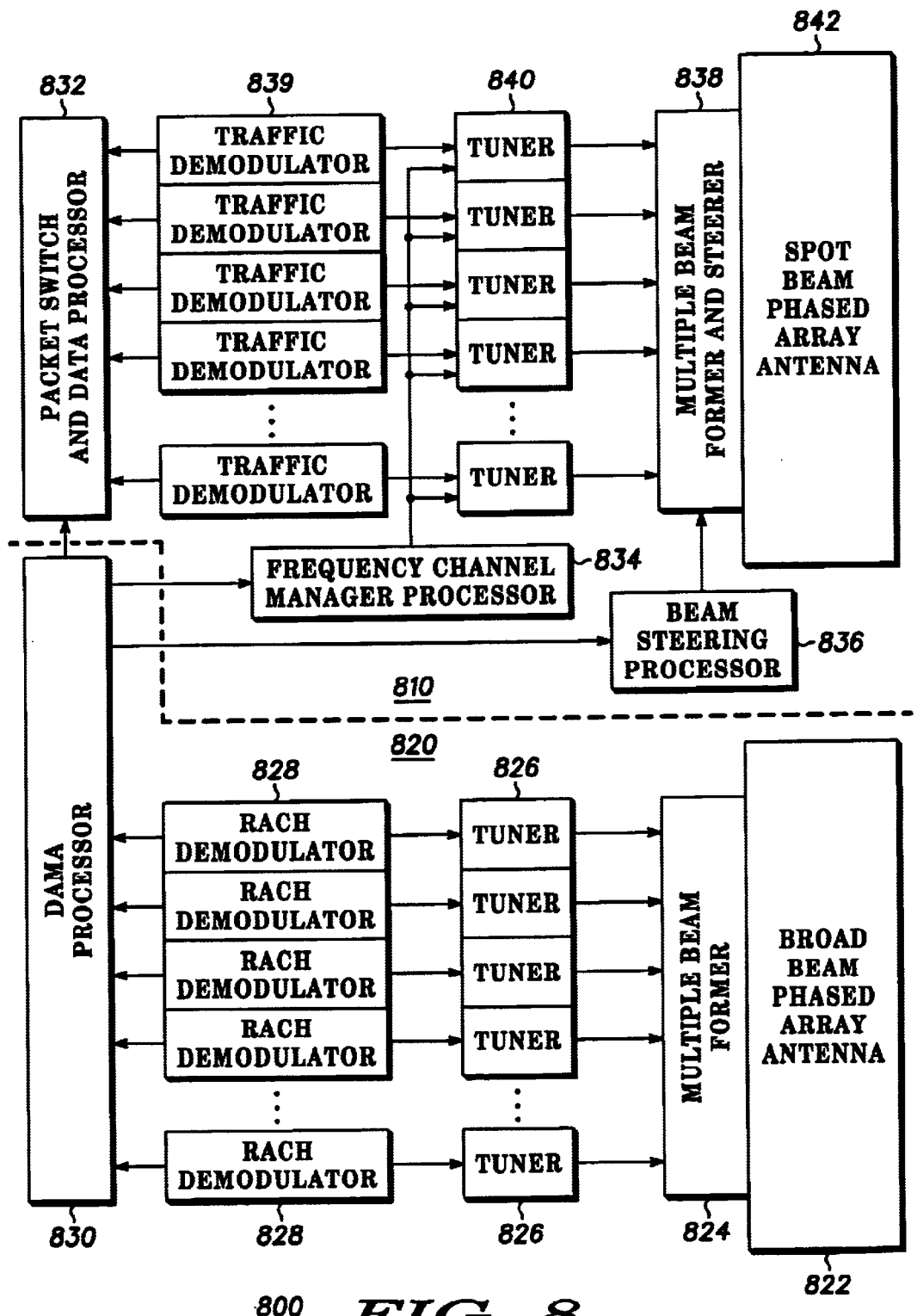
FIG. 8 illustrates a block diagram of a satellite uplink subsystem in accordance with a preferred embodiment of the present invention.

FIG. 8 illustrates a block diagram of a satellite uplink antenna subsystem 800 in accordance with a preferred embodiment of the present invention. In a preferred embodiment, antenna uplink subsystem 800 includes two lower level subsystems: signaling uplink subsystem 820 and traffic uplink subsystem 810. Signaling uplink subsystem 820 includes Broad Beam Phased Array Antenna 822 and Multiple Beam Former 824 that in concert create a set of signaling beams, such as signaling beams 210 (FIG. 2). Signaling beams 210, in a preferred embodiment, are substantially fixed beams that cover substantially the entire satellite FOV. Multiple Beam Former 824 is connected to tuners 826 that establish the frequency of operation of a receiver associated with each beam. Tuners 826 include amplifiers, oscillators, filters and other receiver components (not shown) known to those familiar with the art. The output of tuners 826 is sent to a Random Access Channel (RACH) Demodulator 828 connected to a tuner 826. RACH demodulators 828 recover the signaling data in the DAMA request message using known techniques and send the signaling data to DAMA Processor 830.

DAMA Processor 830 is comprised of microprocessors, memories and computer interface components and other standard computer hardware (not shown) and includes software that performs the DAMA assignment process to provide radio resource assignments for UE transmit opportunities (as discussed with reference to FIGS. 6 and 7). UE DAMA assignments for UE transmit opportunities are sent to Packet Switch and Data Processor 832, which sends the assignments on to the downlink subsystem (not shown) for transmission to the UE.

DAMA Processor 830 also sends commands to Frequency Channel Manager Processor 834 and Beam Steering Processor 836 in Traffic Uplink Subsystem 820. These commands cause the Traffic Uplink Subsystem 810 to configure itself to conform to the radio resource plan determined by DAMA Processor 830.

Traffic Uplink Subsystem 810 comprises elements similar to those of Signaling Uplink Subsystem 820 with certain exceptions. Traffic Uplink Subsystem 810 includes Phased Array Antenna 842 and Multiple Beam Former and Steerer 838 for creating electronically steerable spot beams, such as spot beams 220 (FIG. 2) in contrast to the relatively large signaling beams 210 (FIG. 2) created by Signaling Subsystem 820. Additionally, tuners 840 are connected to Multiple Beam Former and Steerer 838 and are tunable to different frequency channels than those of tuners 826 of Signaling Uplink Subsystem 820. Traffic Demodulators 839 connected to tuners 840 operate to demodulate traffic data transmitted to the satellite through the traffic uplink. Data traffic received from Traffic Demodulators 839 is sent to Packet Switch and Data Processor 832 which sends the traffic on to other elements of satellite communication system 100 (FIG. 1) in accordance with accompanying transmission instructions.

Frequency Channel Manager Processor 834 and a Beam Steering Processor 836 are responsible for appropriately adjusting the frequency channel associated with each traffic spot beam and for directing the traffic spot beams respectively. These elements perform the aforementioned operations in response to commands from DAMA Processor 830.

The frequency channels may be changed and the traffic spot beams may be directed to new locations during the beam steering time-slots 614 shown in the timing diagram of FIG. 6 in accordance with instructions from Beam Steering Processor 836. Thus, Traffic Uplink Subsystem 810 may be reconfigured for each uplink timeslot. With this capability, the satellite may share its radio resources between numerous UE devices in its FOV. This results in efficient statistical multiplexing of the channel usage because there is generally a large number of UE devices within the FOV and because no one UE device ties up a channel any longer than it takes for it to send the data it has waiting.

Figure 9:
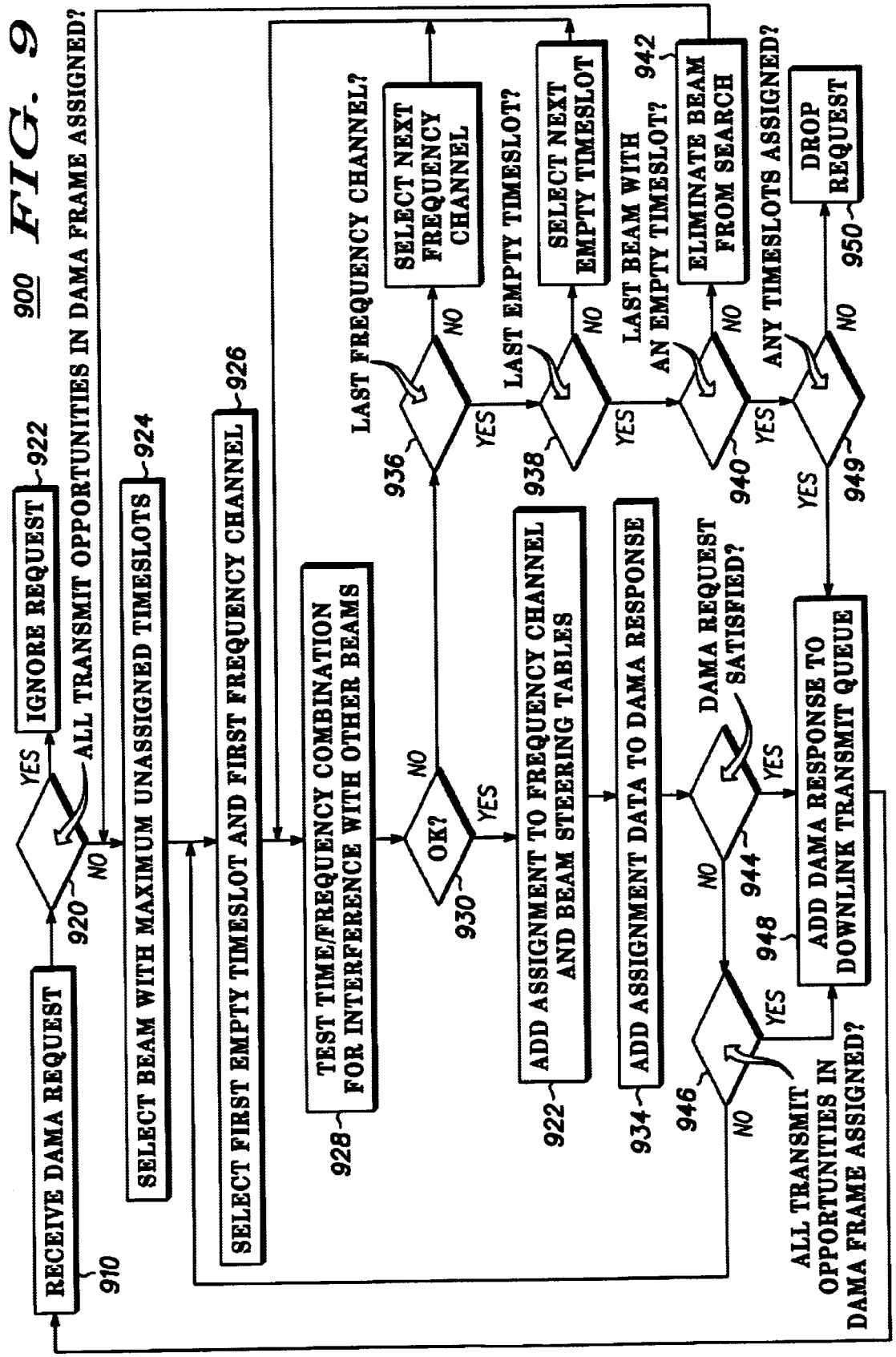
FIG. 9 illustrates a flow diagram of a method for assigning a transmit opportunity to a UE device in accordance with a preferred embodiment of the present invention.

FIG. 9 illustrates a flow diagram of a method for assigning a transmit opportunity to a UE device in accordance with a preferred embodiment of the present invention. Method 900 begins in step 910 when a DAMA request is received in DAMA Processor 834 (FIG. 8). DAMA Processor 834 first determines in step 920 whether all transmit opportunities in the relevant DAMA frame have been assigned or whether there are any transmit opportunities (e.g., open time-slots in any beam) available in the appropriate DAMA frame. If no opportunities are available, the method proceeds to step 922, and the request is ignored. If there are transmit opportunities available in step 920, DAMA Processor 834 first attempts to assign a transmit opportunity in the beam with the most unassigned time-slots in step 924. In step 926, DAMA Processor 834 selects the first time-slot and, in step 928, attempts to find a frequency channel that will not interfere with other, previously assigned, transmit opportunities during that timeslot. This step comprises looking for any other beam that has been assigned to the same frequency channel during the time-slot in question. If the DAMA Processor determines in step 930 that no other beam has been assigned to the same frequency channel, then there is no interference. If another beam has been assigned the same frequency channel during the timeslot, the DAMA Processor checks the beam steering commands for the beams with that same frequency against the separation and other predetermined geometric criteria that assure there will be no interference. If the beams pass all of the geometric criteria, the transmit opportunity is assigned in step 932 and the required control information is entered in the appropriate control tables. These tables include the beam steering command tables and the frequency selection tables. In addition, the assignment data is added to the DAMA response message in step 934.

If all of the frequency channels are found to interfere with another beam during the timeslot in step 936 and 938, the satellite selects a different time-slot in step 938 and repeats the frequency channel tests. If all of the time-slots on a particular beam are found to interfere with all frequencies in step 940, then in step 942 the satellite eliminates that beam from future consideration for additional assignments during the frame, selects the beam with the next largest number of available time-slots, and repeats the assignment process. If the satellite searches all available opportunities and determines that the DAMA request cannot be satisfied, it determines in step 949 if any part of the request may be satisfied. If so, the DAMA response message is placed in the downlink transmission queue in step 948, and the method returns to step 910 to await the next DAMA request. If not, the DAMA request is dropped in step 950.

When an assignment is made, the satellite checks the request to see if enough assignments have been made to satisfy the request in step 944. If so, the DAMA response message is placed in the downlink transmission queue in step 948 and the method returns to step 910 to await the next DAMA request. In not, the process is repeated in step 946 to find another transmit opportunity. When the DAMA response is placed in the transmitter queue in step 948, all ancillary data required for delivery, such as UE address and appropriate beam steering angles are included in the queue along with the actual DAMA response message content.

Figure 10:
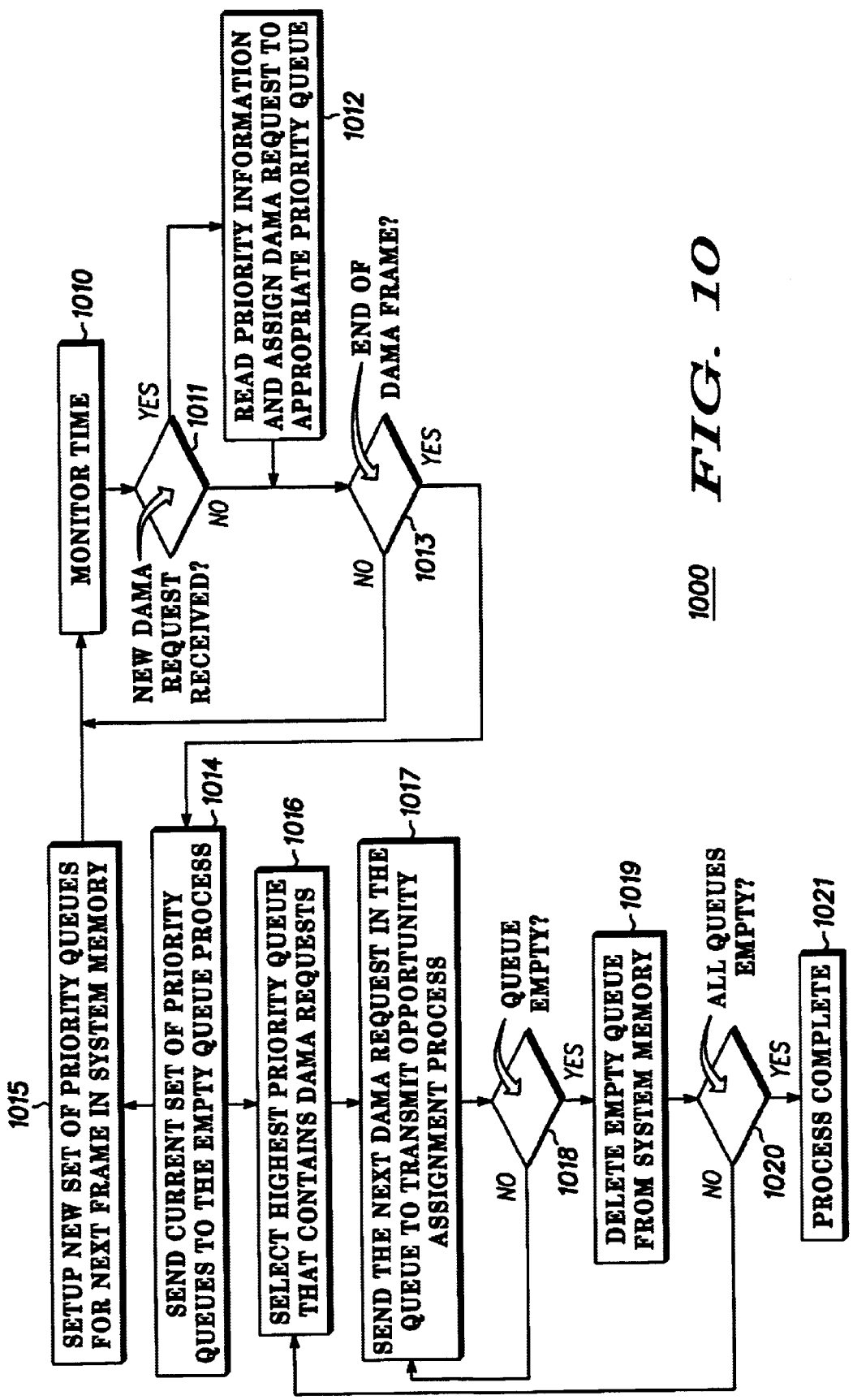
FIG. 10 illustrates a method for assigning service priorities for the transmit opportunity assignment process of FIG. 9.

FIG. 10 illustrates a method 1000 for assigning service priorities for the transmit opportunity assignment process of FIG. 9. As discussed with reference to FIG. 6, method 900 for assigning a transmit opportunity to a UE may be initiated immediately upon a satellite receiving a DAMA request from the UE. In a high quality, high capacity data network, however, it is desirable to provide transmit opportunities in accordance with service priorities in accordance with method 1000. In a preferred embodiment, method 1000 is executed by DAMA Processor 834 of satellite uplink antenna subsystem 800 (FIG. 8).

Method 1000 begins in step 1010, where DAMA Processor 834 monitors the system time. In step 1011, DAMA Processor 834 detects if a new DAMA request has been received. If the processor detects a new DAMA request in step 1011, step 1012 reads priority information associated with the request and assigns the DAMA request to one of a plurality of priority queues based on the priority information included in the DAMA request message.

In a preferred embodiment, if the DAMA request message requests more than one transmit opportunity, all of the opportunities are assigned at the same priority. If a particular UE device desires to transmit traffic data with multiple priorities, it sends a separate DAMA request for each priority, with the highest priority request sent first. In an alternate embodiment the UE sends one DAMA request with multiple priorities, where the number of transmit opportunities required for each priority is specified in the DAMA request message. This alternate embodiment avoids the delays associated with sending several DAMA messages, at the expense of requiring more information per message even when that information is not necessary, and at the expense of a more complicated priority assignment process in the UE and satellite.

In step 1013, method 1000 determines if the time has reached the end of the current DAMA frame. If not method 1000 returns to step 1010 to await another DAMA request.

If in step 1013, method 1000 determines that the time has reached the end of the DAMA frame, then in step 1014 DAMA Processor 834 sends the plurality of priority queues to an empty queue subprocess that begins with step 1016. Step 1015 creates a new set of priority queues to be used in the next DAMA frame and reinitiates the process for the next DAMA frame at step 1010.

The empty queue subprocess begins in step 1016, where DAMA Processor 834 selects the highest priority queue that contains a DAMA request. In step 1017 the first DAMA request in the selected queue is sent for processing through the transmit opportunity assignment process described with reference to method 900 (FIG. 9). Step 1017 preferably uses a first-in-first-out rule, but other rules also could be applied. In step 1018, DAMA Processor 834 determines if the selected queue is empty. If the selected queue is not empty, the process is returned to step 1017 where DAMA requests in the queue continue to be sent to the transmit opportunity process. If, in step 1018, it is determined that the selected queue is empty, method 1000 proceeds to step 1019, and the queue is deleted from the DAMA Processor's memory.

In step 1020, method 1000 determines if all queues are empty and have been deleted. If so, the queue emptying process is complete, and method 1000 ends in step 1021 until the queues are received for the next DAMA frame. If, in step 1020, method 1000 determines that one or more of the priority queues still contains DAMA request messages, the method returns to step 1016 to process the next highest priority queue.

Figure 11:
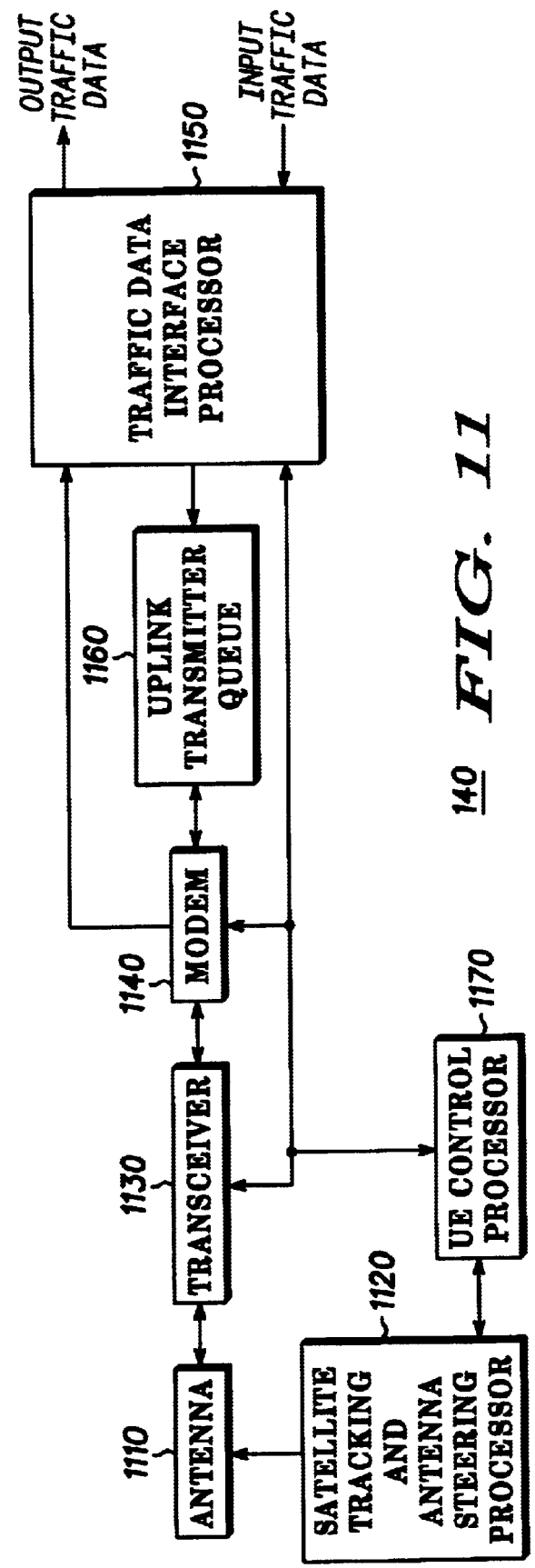
FIG. 11 illustrates a block diagram of a UE device in accordance with a preferred embodiment of the present invention.

FIG. 11 illustrates a block diagram of a UE device in accordance with a preferred embodiment of the present invention. UE device 140 includes steerable antenna 1110 with associated satellite tracking and antenna steering processor 1120, which includes processing capabilities and mechanisms for steering antenna beams to acquire and track the serving satellite. Antenna 1110 is connected to transceiver 1130 and modem 1140, which is in communication with Uplink Transmitter Queue 1160.

Input traffic data received on the downlink is sent to Traffic Data Interface Processor 1150, which formats the data and presents it to external user(s) and/or network(s). Uplink traffic data also is received from an external user or network via Traffic Data Interface Processor 1150, which formats it for transmission and places it in a buffer which serves as Uplink Transmitter Queue 1160. UE operations are directed and coordinated by UE Control Processor 1170.

Figure 12:
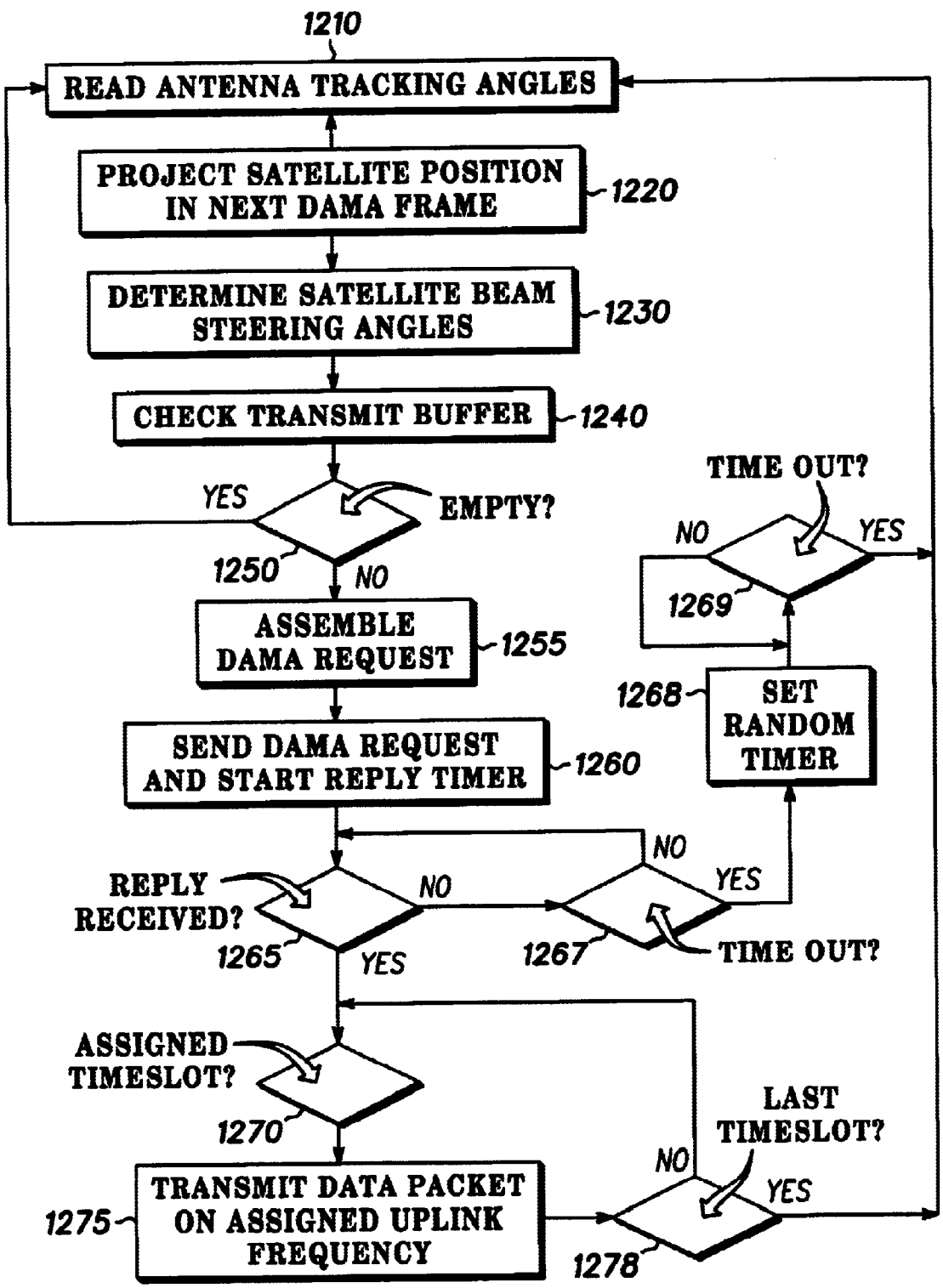
FIG. 12 illustrates a flow diagram of a method for transmitting data from a UE device in accordance with a preferred embodiment of the present invention.

FIG. 12 illustrates a flow diagram of a method for transmitting data from a UE device in accordance with a preferred embodiment of the present invention. Method 1200 desirably is initiated at least once in each DAMA frame (624, 625, 626, FIG. 6). In a preferred embodiment, method 1200 is initiated on an interrupt basis whenever a new set of data is placed in Uplink Transmit Queue 1160 and is also executed on a scheduled basis at the beginning of each DAMA frame.

In step 1210, UE 140 reads the antenna tracking angles associated with the serving satellite and in step 1220 projects the satellite position during the next two DAMA frames. Desirably, this is accomplished using and an orbit propagator based on known algorithms available for this purpose. In a preferred embodiment, the propagator is periodically corrected using position data that is sent by the satellite over a downlink general broadcast channel. The UE then uses the projected satellite position and the known UE device position to determine the beam steering angles that the satellite should use in order to direct a traffic spot beam 220 (FIG. 2)

to the UE device's location. This process enables the UE device to determine appropriate satellite beam steering angles in step 1230. In a preferred embodiment, the projected angles are valid only for a short duration, for example on the order of a maximum of 106 ms. During this time, the satellite desirably has progressed a relatively small distance, for example on the order of less than one km along its orbit. Having the UE determine the satellite beam steering angles for its one location in accordance with the present invention is more efficient than having the satellite perform this function for the potentially millions of UE locations with which the satellite may be required to establish a link. With this innovation, the satellite processing load is substantially reduced, particularly in a NGSO satellite.

In step 1240, the UE checks whether there is data awaiting transmission in Uplink Queue 1160 (FIG. 11). If not, method 1200 returns to step 1210 and waits for the process to be initiated again. If there is data awaiting transmission in Uplink Queue 1160, the UE determines how many time-slots are necessary to empty the queue and assembles a DAMA request for these resources in step 1255. In a preferred embodiment, the UE also assigns service priorities (not shown) to the request in accordance with direction received by the user or external network and in accordance with permission previously obtained from NCF 130 (FIG. 1). In an alternate embodiment, the UE uses a priori knowledge of user behavior and/or previous user behavior to predict how many packets are expected to need to be transmitted during the DAMA frame. In this case, the UE modifies the DAMA request message to include resources for these expected packets as well as for the packets already waiting in the uplink queue.

In step 1260, the UE sends the DAMA request message over one of the signaling uplink random access channels and starts a reply timer. It then checks for a reply in the form of a DAMA response message from the satellite in step 1265. If the reply is not received within the expected time in step 1267 (as determined by a wait timer in the UE), the UE sets a random time interval timer in step 1268, monitors the time in step 1269, and then reinitiates the DAMA request process at the end of the specified time interval. The aforementioned steps represent a modification of the known Aloha process that is used in prior art systems. In the present invention, the standard Aloha process is modified such that the UE recomputes the satellite beam steering angles and reevaluates how many time-slots will be necessary to transmit all of the data in the uplink queue. This differs from a standard Aloha process that simply waits for a random time interval and then retransmits the same message.

If in step 1265, the UE has received a reply in the form of a DAMA response message from the satellite, the UE waits for the first assigned timeslot in step 1270, and in step 1275 transmits a packet during that time-slot on the assigned frequency. If the DAMA response message provided more than one timeslot, in step 1278, it waits for the next opportunity and transmits a packet on that assigned frequency. This process continues until the last time-slot assigned in the DAMA response is finished. The UE then returns to step 1210 to await the next process initiation.

The foregoing description of the specific embodiments will so fully reveal the general nature of the invention that others can, by applying current knowledge, readily modify or adapt for various applications such specific embodiments without departing from the generic concept and, therefore, such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method for providing service in a satellite communication system having at least one satellite and at least one user equipment (UE) device, the method comprising the steps of:

projecting within a field of view (FOV) of a satellite a first set of antenna beams;

receiving from the UE device to the satellite, using an uplink signaling channel within a signaling frequency band associated with the first set of antenna beams, a demand assigned multiple access (DAMA) request to transmit traffic data to the satellite;

sending the UE device a DAMA response message; and directing a spot beam from the satellite to establish a traffic uplink for transmitting the data traffic from the UE to the satellite in accordance with a set of parameters included in the DAMA response message, wherein the gain of the spot beam exceeds the gains of each of the first set of antenna beams, and wherein the set of traffic uplink channels operate in a radio frequency band at least ten times greater than the signaling frequency band.

2. The method as claimed in claim 1, wherein the DAMA request comprises a request for service including an identification of an amount of traffic data the UE desires to transmit to the satellite and an identification of the UE location in terms of satellite beam pointing angles calculated by the UE.

3. The method as claimed in claim 1, wherein the DAMA response message includes a time-slot assignment and a frequency channel assignment.

4. The method as claimed in claim 3, wherein immediately prior to a first assigned time-slot of the time-slot assignment, steering the spot beam to a location within the FOV of the satellite that includes the UE device and directing the spot beam to receive the data traffic from the UE in accordance with the frequency channel assignment.

5. The method as claimed in claim 1, wherein the first set of antenna gain beams support a set of signaling uplink channels operating at relatively low frequencies with relatively low data rates while the spot beam supports a set of traffic uplink channels operating at a relatively high frequency and with a relatively high data rate.

6. The method as claimed in claim 5, wherein the set of signaling uplink channels operate at a data rate at least one thousand times lower than a data rate at which the set of traffic uplink channels operate.

7. The method as claimed in claim 5, wherein the set of signaling uplink channels operate at a radio frequency band that is substantially the same as a radio frequency band at which the set of traffic uplink channels operate.

8. The method as claimed in claim 3, wherein immediately prior to a first assigned time-slot of the time-slot assignment, the satellite directs an assigned spot beam to establish an uplink to receive the data traffic in accordance with the frequency channel assignment.

9. The method as claimed in claim 8, further comprising the step of:

transmitting data traffic from the UE device to the satellite through an uplink channel associated with the assigned spot beam in accordance with the frequency channel assignment and the time-slot assignment.

10. The method as claimed in claim 1, wherein the DAMA response message comprises a single traffic time slot assignment.

11. The method as claimed in claim 1, wherein the DAMA response message comprises multiple traffic time slot assignments and multiple radio frequency channel assignments.

12. The method as claimed in claim 1, wherein the DAMA response message comprises multiple traffic time slot assignments and a single radio frequency channel assignment.

13. The method as claimed in claim 1, wherein the DAMA response message comprises a single radio frequency channel assignment, a time slot assignment, and a CDMA code assignment.

14. The method as claimed in claim 1, wherein the DAMA response message comprises a traffic time slot assignment and multiple radio frequency channel assignments.

15. An uplink antenna subsystem for use in a satellite of a satellite communication system, the uplink antenna subsystem comprising:

a signaling uplink subsystem for forming a set of uplink signaling beams associated with an uplink signaling channel within a signaling frequency band for receiving a demand assigned multiple access (DAMA) request to transmit traffic data from a user equipment (UE) device to the satellite; and a traffic uplink subsystem In communication with the signaling uplink subsystem for forming a traffic spot beam associated with a traffic uplink and for directing the traffic spot beam to a location of a UE device in response to a request for service by the UE device, wherein the gain of the spot beam exceeds the gains of each of the uplink signaling beams and wherein the spot beam operates in a radio frequency band at least ten times greater than the signaling frequency band; and a demand assigned multiple access (DAMA) processor for performing a DAMA assignment process to assign a resource associated with the satellite to support a UE transmit opportunity.

16. The uplink antenna subsystem as claimed in claim 15, wherein the signaling uplink system comprises a broad beam phased array antenna connected to a multiple beam former linked in communication with a beam steering processor for conforming the first set of uplink signaling beam to a radio resource plan determined by the DAMA processor.

17. The uplink antenna subsystem as claimed in claim 15, wherein the traffic uplink subsystem comprises a spot beam phased array antenna and a multiple beam former and steerer for directing a traffic spot beam to a UE device in accordance with a command from the DAMA processor.

18. The uplink antenna subsystem as claimed in claim 15, wherein the set of uplink signaling beams comprise a set of substantially fixed beams that cover substantially all of a field of view (FOV) of the satellite substantially simultaneously.

19. The uplink antenna subsystem as claimed in claim 15, wherein the uplink signaling beams comprise a set of beams, and wherein each beam of the set of relatively low gain beams is connected to a relatively low data rate random access channel.

20. The uplink antenna system as claimed in claim 15, wherein the traffic uplink spot beam comprises a beam operating at a relatively high frequency and with a relatively high data rate.

21. The uplink antenna subsystem as claimed in claim 15, wherein the traffic uplink subsystem directs the traffic spot beam to substantially any point within a field of view (FOV) of the satellite.

22. The uplink antenna subsystem as claimed in claim 15, wherein the traffic uplink subsystem directs the traffic spot beam to substantially any point within a portion of a field of view (FOV) of the satellite.

23. The uplink antenna subsystem as claimed in claim 15, wherein the traffic uplink subsystem forms multiple traffic spot beams covering substantially any point within a field of view (FOV) of the satellite.

24. The uplink antenna subsystem as claimed in claim 23, wherein only a subset of spot beams of the multiple traffic spot beams is available to carry uplink traffic, and wherein certain spot beams of the subset of spot beams are designated to carry traffic at a particular time based on user demand.

25. The uplink antenna subsystem as claimed in claim 15, wherein the DAMA assignment process comprises the steps of:

receiving in the DAMA processor the DAMA request;

determining that the satellite has appropriate resources available to assign a transmit opportunity to the UE within a relevant DAMA frame;

assigning the transmit opportunity to the UE; and sending a DAMA response message including assigned parameters for the transmit opportunity to the UE.

26. The uplink antenna subsystem as claimed in claim 25, further comprising the step of:

assigning a service priority to the transmit opportunity.

27. The uplink antenna subsystem as claimed in claim 26, wherein the step of assigning a service priority to the transmit opportunity comprises the step of:

reading priority information associated with the DAMA request;

assigning the DAMA request to an appropriate priority queue;

selecting a highest priority queue containing a DAMA request; and sending the DAMA request to the DAMA processor to receive a transmit opportunity assignment.

* * * * *